US011959310B2

(12) United States Patent
Singh

(10) Patent No.: US 11,959,310 B2

(45) Date of Patent: Apr. 16, 2024

(54) STRIKE ASSEMBLY FOR DOOR LOCKING MECHANISM, AND METHOD OF OPERATION

(71) Applicant: DORMAKABA CANADA INC., Montréal (CA)

(72) Inventor: Mandeep Singh, Kitchener (CA)

(73) Assignee: DORMAKABA CANADA INC., Montreal (CA)

( * ) Notice: Subject to any disclaimer, the term of this patent is extended or adjusted under 35 U.S.C. 154(b) by 183 days.

(21) Appl. No.: 16/960,130

(22) PCT Filed: Feb. 14, 2019

(86) PCT No.: PCT/CA2019/050182
§ 371 (c)(1),
(2) Date: Jul. 6, 2020

(87) PCT Pub. No.: WO2019/165541
PCT Pub. Date: Sep. 6, 2019

(65) Prior Publication Data

US 2021/0062548 A1 Mar. 4, 2021

Related U.S. Application Data

(60) Provisional application No. 62/635,580, filed on Feb. 27, 2018.

(51) Int. Cl.
*E05B 47/00* (2006.01)
*E05B 15/02* (2006.01)

(52) U.S. Cl.
CPC ........ *E05B 47/0047* (2013.01); *E05B 15/022* (2013.01); *E05B 47/0002* (2013.01);
(Continued)

(58) Field of Classification Search
CPC ............ Y10T 292/696; Y10T 292/702; Y10T 292/699; Y10T 70/7062; E05B 47/0047;
(Continued)

(56) References Cited

U.S. PATENT DOCUMENTS 4,211,443 A * 7/1980 Butts .................. E05B 47/0047 292/341.16
6,390,520 B1 * 5/2002 Holzer ............... E05B 47/0046 292/341.16

(Continued)

FOREIGN PATENT DOCUMENTS

CA 2509188 C 7/2011
EP 0 851 077 A1 7/1998

(Continued)

OTHER PUBLICATIONS

International Search Report and Written Opinion for PCT/CA2019/050182, dated May 2, 2019.

*Primary Examiner* — Mark A Williams
(74) *Attorney, Agent, or Firm* — Norton Rose Fulbright Canada LLP

(57) ABSTRACT

The electric strike can have a housing having an internal face receivable against a receiving face of a door frame, an external strike face, a socket recessed into the strike face along a socket axis normal to the receiving face of the door frame, for receiving a male locking member retractably mounted to a door, the male locking member also being moveable transversally to the socket axis, along a horizontal escape path, by opening the door, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall
(Continued)

of the socket blocking the escape path when in the closed configuration, and a distal end.

16 Claims, 7 Drawing Sheets

(52) U.S. Cl.
CPC . *E05B 2047/0073* (2013.01); *E05Y 2201/462* (2013.01); *E05Y 2201/474* (2013.01); *E05Y 2201/484* (2013.01); *E05Y 2900/132* (2013.01)

(58) Field of Classification Search
CPC ......... E05B 47/0046; E05B 2047/0073; E05B 63/244; E05B 63/248; E05B 63/246; E05B 15/02; E05B 15/0205; E05B 15/022; E05B 47/0002; E05B 47/0003; E05B 47/0004; E05Y 2201/462; E05Y 2201/474; E05Y 2201/484; E05Y 2900/132
See application file for complete search history.

(56) References Cited

U.S. PATENT DOCUMENTS

| | | | | |
|---|---|---|---|---|
| 6,595,563 | B2 * | 7/2003 | Kiernan | E05B 47/0047 292/201 |
| 7,021,684 | B2 * | 4/2006 | Orbeta | E05B 47/0046 292/201 |
| 7,438,335 | B1 * | 10/2008 | Uyeda | E05B 47/0046 292/341.15 |
| 8,047,585 | B1 * | 11/2011 | Peabody | E05B 47/0046 292/341.15 |
| 8,096,594 | B2 * | 1/2012 | Uyeda | E05B 47/0046 292/341.15 |
| 8,454,063 | B2 * | 6/2013 | David | E05B 47/0046 292/341.15 |
| 9,376,835 | B2 * | 6/2016 | Schildwachter | E05B 17/06 |
| 9,617,755 | B2 * | 4/2017 | Peabody | E05B 15/022 |
| 9,657,501 | B2 | 5/2017 | Armari et al. | |
| 9,702,167 | B2 * | 7/2017 | Liao | E05B 47/0046 |
| 10,697,202 | B2 * | 6/2020 | Geringer | E05B 65/1093 |
| 10,988,959 | B1 * | 4/2021 | Martin | E05B 47/0046 |
| 2002/0029526 | A1 * | 3/2002 | Kiernan | E05B 47/0047 49/503 |
| 2011/0181059 | A1 | 7/2011 | David et al. | |
| 2016/0053511 | A1 | 2/2016 | Peabody et al. | |

FOREIGN PATENT DOCUMENTS

| | | | |
|---|---|---|---|
| GB | 2223058 | A | 3/1990 |
| WO | 198800633 | A1 | 1/1988 |
| WO | 2003087503 | A1 | 10/2003 |
| WO | 2004101922 | A1 | 11/2004 |

* cited by examiner

STRIKE ASSEMBLY FOR DOOR LOCKING MECHANISM, AND METHOD OF OPERATION

BACKGROUND

Electric strikes have a keeper which can be moved by a motor to allow freeing a latch or bolt otherwise trapped in its socket. There are various types of electric strikes, some are adapted to be used with electronic access control modules whereby the keeper is opened when the electronic access input is authenticated, and others are simply fail safe devices which are normally powered to restrain the keeper, but where the keeper is freed when an emergency or power outage occurs.

Electric strikes of the surface mount type are typically provided as standalone devices having their components secured to and housed within a single housing. They are designed to be fastened to a door frame. Electric strikes of the surface mount type pose specific challenges. One of these is the challenge associated with embedding the mechanical and electrical components required to achieve the desired functionality with a satisfactory level of security, reliability and cost, within a relatively slim housing. Electric strikes of the surface mount type were made available in ¾" thickness. Although existing electric strikes of the surface mount type were satisfactory to a certain degree, there remained room for improvement.

SUMMARY

In accordance with one aspect, there is provided an electric strike which has a keeper which is adapted to be pivoted in the plane of the door frame, around a pivoting axis which is parallel to the retraction axis of the latch or bolt (and accordingly, parallel to the orientation of the socket axis). The pivoting axis can be provided on one side of the socket, and the keeper can have a keeper arm extending across, and closing a fourth edge of the socket, forming a moveable fourth wall to the socket, the other three walls being fixed.

In accordance with another aspect, there is provided an electric strike having a housing having an internal face receivable against a receiving face of a door frame, an external strike face, a socket recessed into the strike face along a socket axis normal to the receiving face of the door frame, for receiving a male locking member retractably mounted to a door, the male locking member also being moveable transversally to the socket axis, along a horizontal escape path, by opening the door, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall of the socket blocking the escape path when in the closed configuration, and a distal end, the gate member and the distal end being moved away from the socket and out from alignment with the escape path when pivoted into the open configuration.

In accordance with another aspect, there is provided an electric strike having a housing having an internal face receivable against a receiving face of a door frame, an external strike face, a socket recessed into the strike face along a socket axis normal to the receiving face of the door frame, for receiving a male locking member retractably mounted to a door, the male locking member also being moveable transversally to the socket axis, along a horizontal escape path, by opening the door, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall of the socket blocking the escape path when in the closed configuration, the gate member extending from the first side of the socket to a distal end located at a second side of the socket when in the closed configuration, the gate member and the distal end being moved away from the socket and out from alignment with the escape path when pivoted into the open configuration, further comprising a catch being moveable selectively into engagement with the distal end when the distal end is in the closed configuration, to prevent pivoting the keeper into the open configuration, and out from engagement with the distal end.

In accordance with another aspect, there is provided a method of operating an electric strike having a housing with an internal face received against a receiving face of a door frame, an external face, a socket recessed into the external face along a socket axis normal to the receiving face, a keeper pivotally mounted around a pivot axis parallel to the socket axis, on a first side of the socket, inside the housing, and pivotable between an open configuration and a closed configuration, the method comprising: engaging a male locking member into the socket, the male locking member being retractably mounted to a door; maintaining the keeper in the closed configuration, thereby preventing the male locking member from moving along a horizontal escape path transversal to the socket axis, and preventing the opening of the door; and releasing the keeper; and pushing the door open, thereby moving the male locking member along the horizontal escape path.

In accordance with another aspect, there is provided a method of operating an electric strike having a housing with an internal face received against a receiving face of a door frame, an external face, a socket recessed into the external face along a socket axis normal to the receiving face, a keeper pivotally mounted around a pivot axis parallel to the socket axis, on a first side of the socket, inside the housing, and pivotable between an open configuration and a closed configuration, the keeper having a gate member extending from the first side of the socket to a distal end located at a second side of the socket when in the closed configuration, the method comprising: engaging a male locking member into the socket, the male locking member being retractably mounted to a door; maintaining a catch engaged with the distal end of the keeper, thereby maintaining the keeper in the closed configuration, preventing the male locking member from moving along a horizontal escape path transversal to the socket axis, and preventing the opening of the door; and moving the catch away from the distal end, thereby releasing the keeper; and pushing the door open, thereby moving the male locking member along the horizontal escape path.

In accordance with still another aspect, there is provided a door system comprising a door hinged at a first edge to a first side of a door frame, a male locking member retractably mounted to the door in a manner to protrude from a second edge of the door, opposite the hinge, and an electric strike having a housing having an internal face received against a receiving face of a second side of the door frame, opposite the hinge, an external face opposite the internal face, a socket recessed into the external face along a socket axis normal to the receiving face of the door frame, for receiving the male locking member, the male locking member also being moveable transversally to the socket axis, along a horizontal escape path, by pivoting of the door around the hinge, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall of the socket blocking the escape path when in the closed configuration, and a distal end, the gate member and the distal end being moved away from the socket and out from interference with the escape path when pivoted into the open configuration.

In accordance with still another aspect, there is provided a door system comprising a door hinged at a first edge to a first side of a door frame, a male locking member retractably mounted to the door in a manner to protrude from a second edge of the door, opposite the hinge, and an electric strike having a housing having an internal face received against a receiving face of a second side of the door frame, opposite the hinge, an external face opposite the internal face, a socket recessed into the external face along a socket axis normal to the receiving face of the door frame, for receiving the male locking member, the male locking member also being moveable transversally to the socket axis, along a horizontal escape path, by pivoting of the door around the hinge, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall of the socket blocking the escape path when in the closed configuration, the gate member extending from the first side of the socket to a distal end located at a second side of the socket when in the closed configuration, the gate member and the distal end being moved away from the socket and out from alignment with the escape path when pivoted into the open configuration, further comprising a catch being moveable selectively into engagement with the distal end when the distal end is in the closed configuration, to prevent pivoting the keeper into the open configuration, and out from engagement with the distal end.

Many further features and combinations thereof concerning the present improvements will appear to those skilled in the art following a reading of the instant disclosure.

DETAILED DESCRIPTION

Figure 1A:
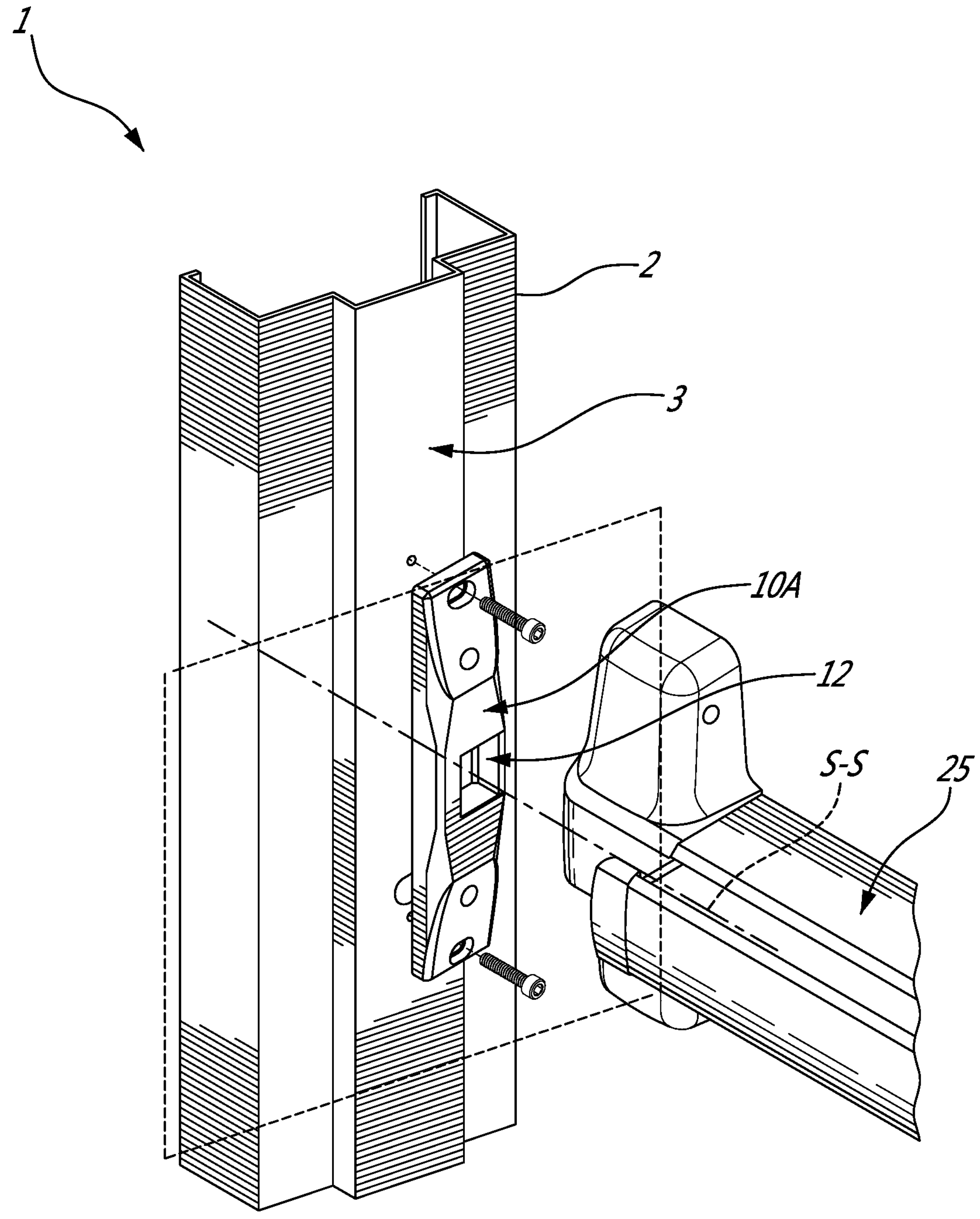
FIG. 1A is an oblique view of a door system having a strike, FIG. 1B being a cross-sectional view of the door system of FIG. 1A in a closed configuration.
Figure 1B:
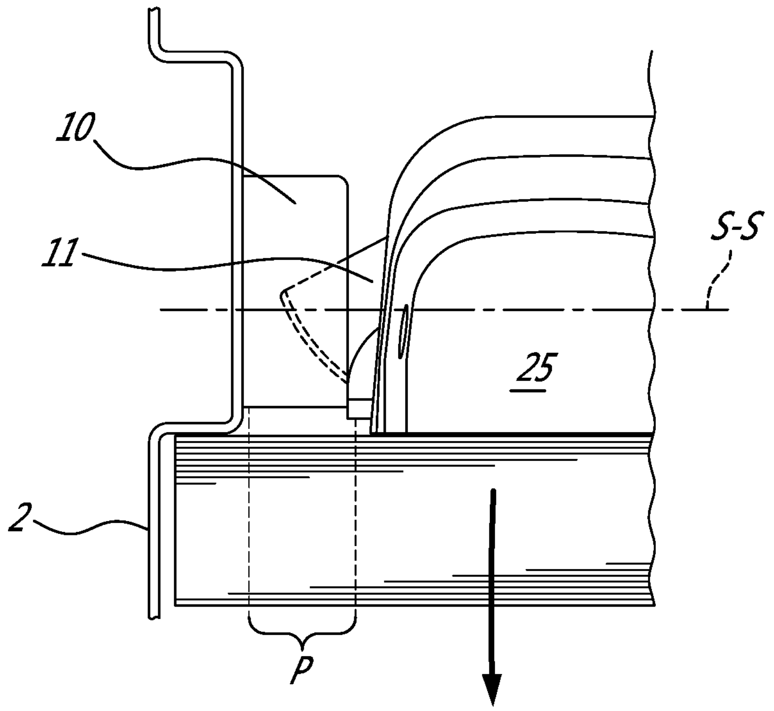

FIGS. 1A and 1B show an example of a door system 1 having a door, a door frame 2, and a locking mechanism. The locking mechanism generally includes a strike 10 which is mounted to the door frame 2, and a male locking member 11 which is retractably mounted to the door. As well known in the art, a locking system is provided on one side/edge of the door and frame 2, and hinges are provided at the other edge of the door, which allow pivoting the door relative to the frame 2 to open the door in a direction shown by the arrow on FIG. 1B.

The strike 10 has a socket 12 which is designed to receive the male locking member 11 when the door is closed. When the door is locked, the male locking member 11 is trapped in the socket 12, which prevents the door from pivoting. In this configuration, both the male locking member 11 and the socket 12 matingly extend in a horizontal orientation parallel with the orientation of the width of the door. This orientation will be referred to herein as the socket axis S-S.

Figure 2:
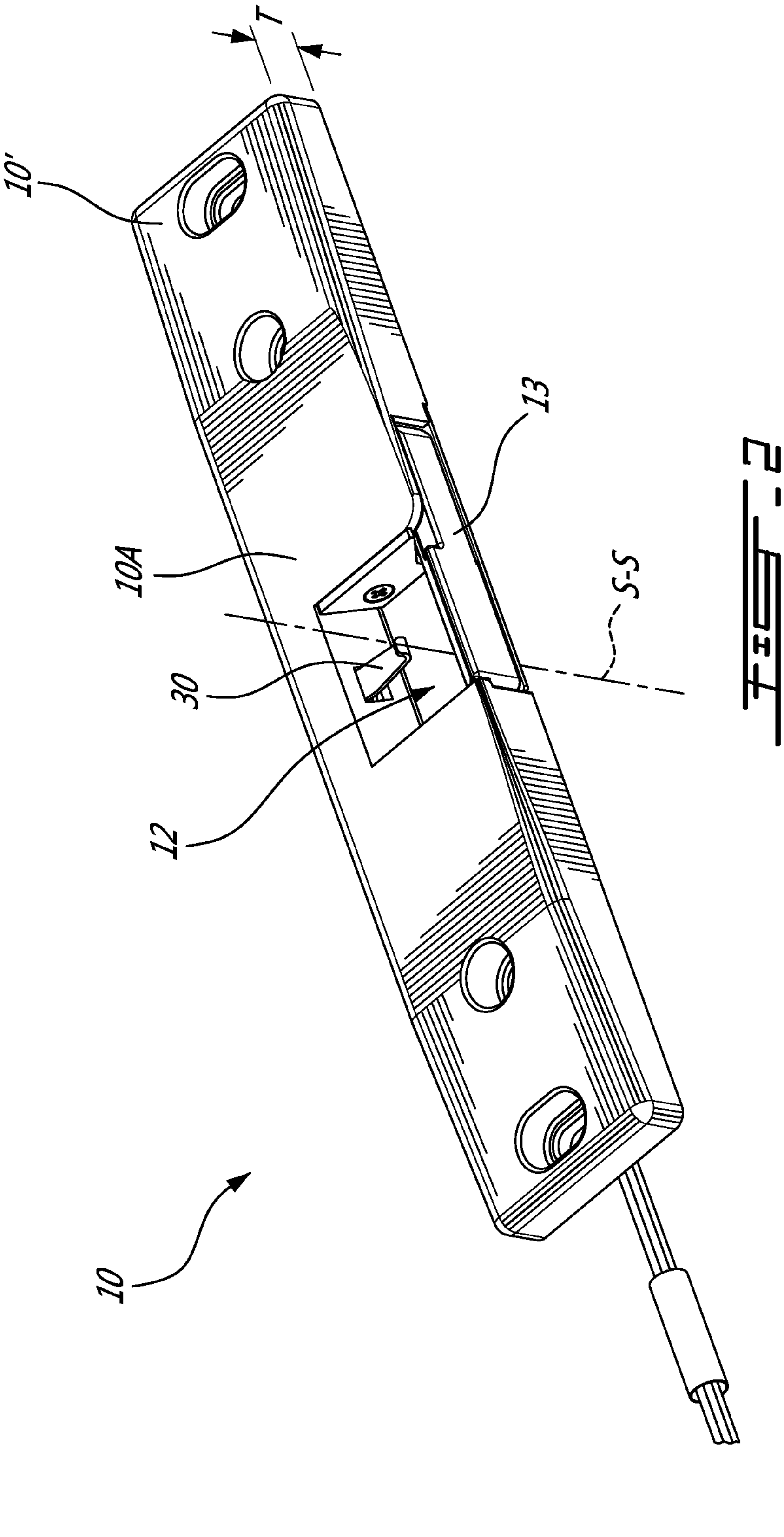
FIG. 2 is an oblique view of a strike assembly.
Figure 3:
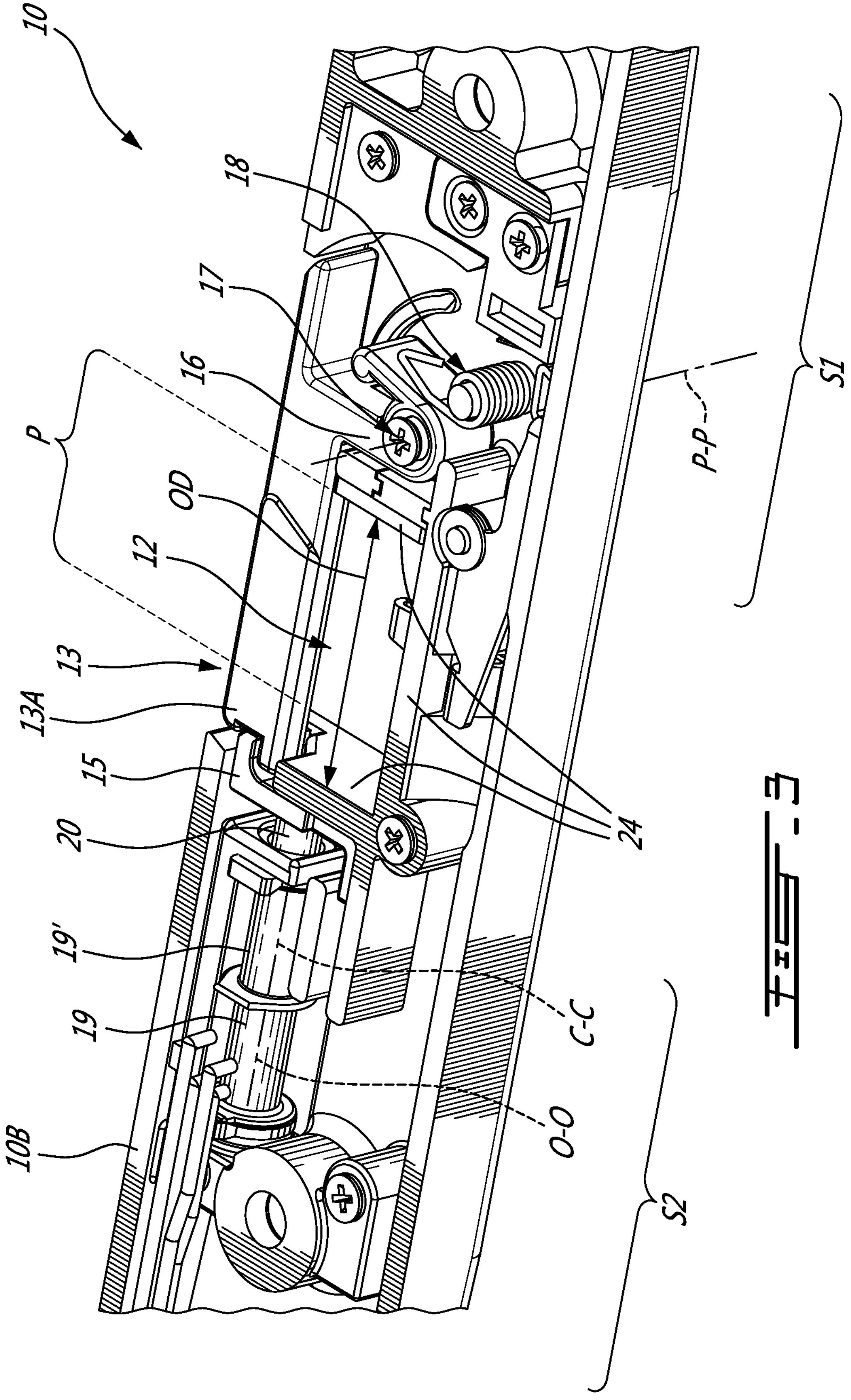
FIG. 3 is another oblique view of the strike assembly, taken from the opposite face.

In accordance with a first embodiment, the strike 10 can be an electric strike of the surface mount type, such as shown in FIGS. 2 and 3. The strike 10, referred to hereinafter as the electric strike 10, can have a keeper 13 which can be pivoted into a closed configuration to trap the male locking member 11 in the socket 12, or pivoted into an open configuration and allow the male locking member 11 to escape the socket 12 along an escape path P, which is shown in FIG. 3, thereby allowing the opening of the door without requiring retraction of the male locking member 11. It will be understood that the escape path P is oriented horizontally and is perpendicular to the socket axis S-S.

A strike of the surface mount type refers to a strike which has a standalone housing which houses all the components of the strike, and which can be mounted to the door frame at the installation site. In this embodiment, the electric strike 10 is a strike of the surface mount type. The electric strike 10 includes a strike face 10A, which can alternately be referred to as an external face, and an internal face 10B which is placed in abutting contact with a receiving face 2A of the door frame 2 when the electric strike 10 is fastened to the door frame 2. In this configuration, the strike axis is normal to the receiving face 2A of the door frame 2, and normal to both the strike face 10A and the internal face 10B of the housing 10'.

FIG. 3 shows internal components of the electric strike 10 (which may also be referred to as the electric strike assembly) via the internal face 10B side of the electric strike 10. More specifically, as shown, the keeper 13 includes a gate member 14 which forms a restraining wall of the socket 12 and which blocks the escape path P when in the closed configuration. The electric strike 10 has an elongated housing 10' which can be oriented vertically during use. Accordingly, the keeper 13 can be said to form a first one of two parallel lateral walls of the socket 12.

The keeper 13 has a distal end 13A which can be selectively locked in place by an actuated catch 15. The keeper 13 also has a connecting member 16 which projects transversally from the gate member 14 at a proximal end thereof, across a width projection of the socket 12, leading to a pivot connection 17 between the keeper 13 and the housing 10'. The pivot connection 17 can be seen to have an axis P-P oriented parallel to the socket axis S-S, and more specifically extending across a thickness T of the housing 10'. As shown in FIG. 3, the pivot connection 17 is on a first side 12A of the socket 12, and offset from the socket 12 and from the escape path P by an offset distance OD, being located behind either one of an upper or lower wall of the socket 12, depending on its direction.

During use, the pivoting motion of the gate member 14 and of the distal end 13A thus runs across the escape path P until it ultimately is moved entirely out from interference with the escape path P, in the configuration shown in FIG.

4C, even if the male locking member 11 were to abut against the receiving face 2A of the frame 2.

In this embodiment, the keeper 13 is biased to the closed position by a biasing member 18, provided here in the form of a coil spring, and is not otherwise electrically actuated. It is the force exerted on the door, and hence on the male locking member 11, which can push the keeper 13 against the bias, to the opened position. However, a locking mechanism which includes a catch 15 operated by an electrical actuator 19 is provided to allow to selectively lock or unlock the pivoting motion of the keeper 13. In this embodiment, the actuator 19 is provided in the form of a solenoid 19' (linear electric motor) having a vertically oriented motion axis O-O and being positioned on a second side 12B of the socket 12, opposite the keeper pivot connection 17. The catch 15 is connected to the solenoid 19' via a plunger 20. Accordingly, the catch 15 can selectively be positioned into engagement with the distal end 13A of the keeper 13 (FIG. 4A), in which case the pivoting motion of the keeper 13 is locked, or retracted out from interference with the distal end 13A of the keeper 13 (FIG. 4B), in which case the pivoting motion is unlocked. Alternate forms of keepers and actuators can be used in alternate embodiments. In this embodiment, an electrical wire allows to connect the solenoid to a power source.

It was found that using a pivot connection 17 having a pivot axis P-P which was parallel to the socket axis S-S, in the configuration shown, could allow to provide the strike 10 assembly in a thickness T of ½", which was found advantageous.

Figure 5:
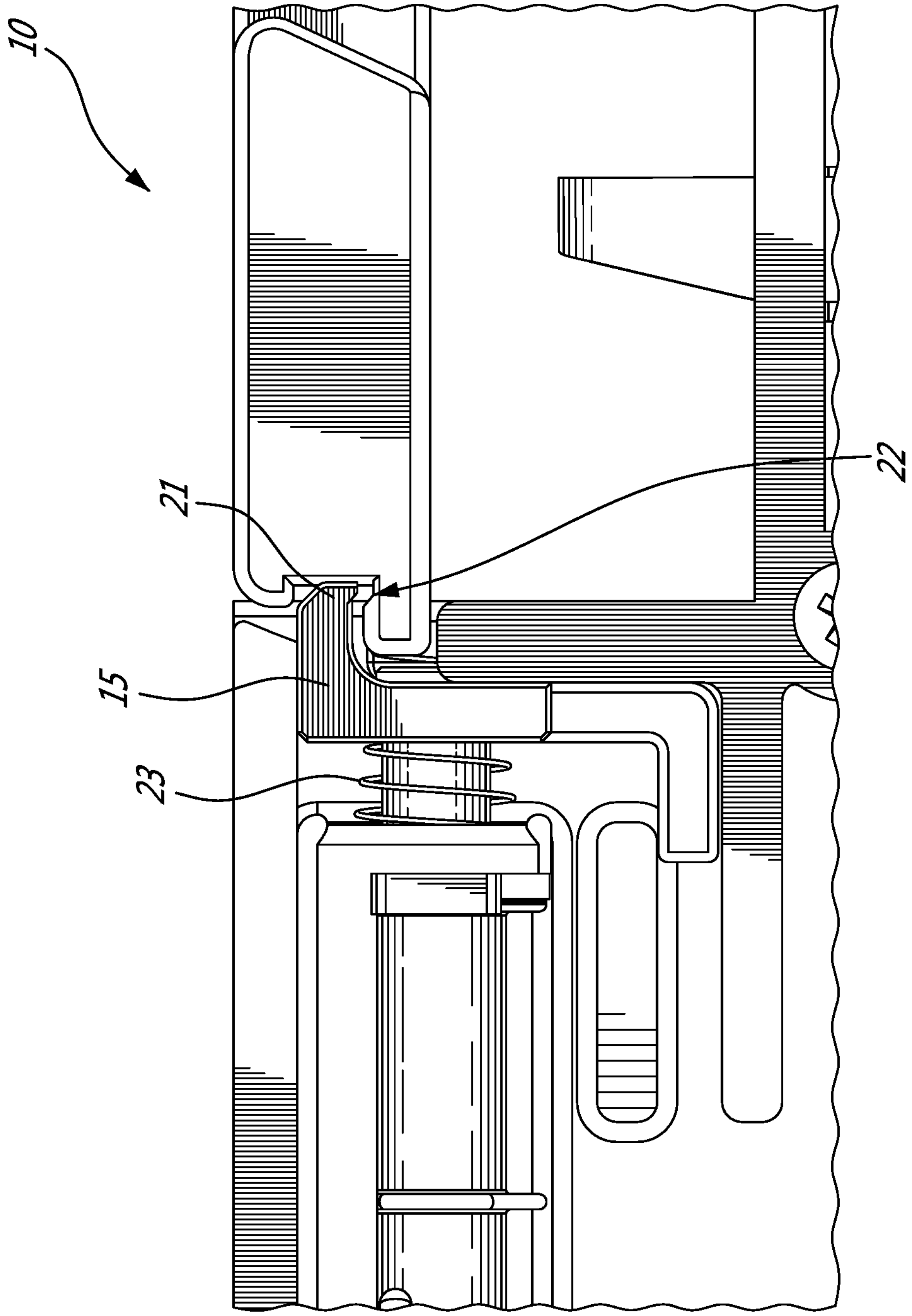
FIG. 5 shows a portion of the strike assembly, enlarged.

As shown more clearly in FIG. 5, in this specific embodiment, the catch 15 is provided with a male tooth feature 21, at a tip thereof, which projects generally in the direction of the socket 12, and the distal end 13A of the keeper 13 is provided with a matingly shaped female notch 22. This tooth and notch engagement feature is optional, but was found to be useful at least in some embodiments in order to provide a better confidence that the locking function will always operate correctly.

Such a catch 15 and keeper 13 engagement can either be designed as failsafe, or fail secure, by biasing the catch 15 one way or another. In the embodiment shown in FIG. 5, the catch 15 is biased by a spring 23 towards the distal end 13A of the keeper 13. Accordingly, if power is lost, the door will remain locked, which is a fail secure configuration. In this latter configuration, the actuator 20 must be electrically powered to overcome the bias and unlock the door. Alternately, the spring 23 can bias the catch 15 away from the distal end of the keeper 13, into a failsafe configuration. In this latter configuration, the actuator 20 must be electrically powered to overcome the bias and lock the door. Different configurations can be better adapted to different conditions.

Referring back to FIG. 3, the socket 12 in this embodiment can be seen to have a rectangular cross-section when taken in a plane normal to the socket axis S-S. The rectangular cross-section is formed by three fixed walls 24, provided here monolithically to the housing structure, and one moveable wall provided here in the form of the gate member 14 of the keeper 13.

Figure 4A:
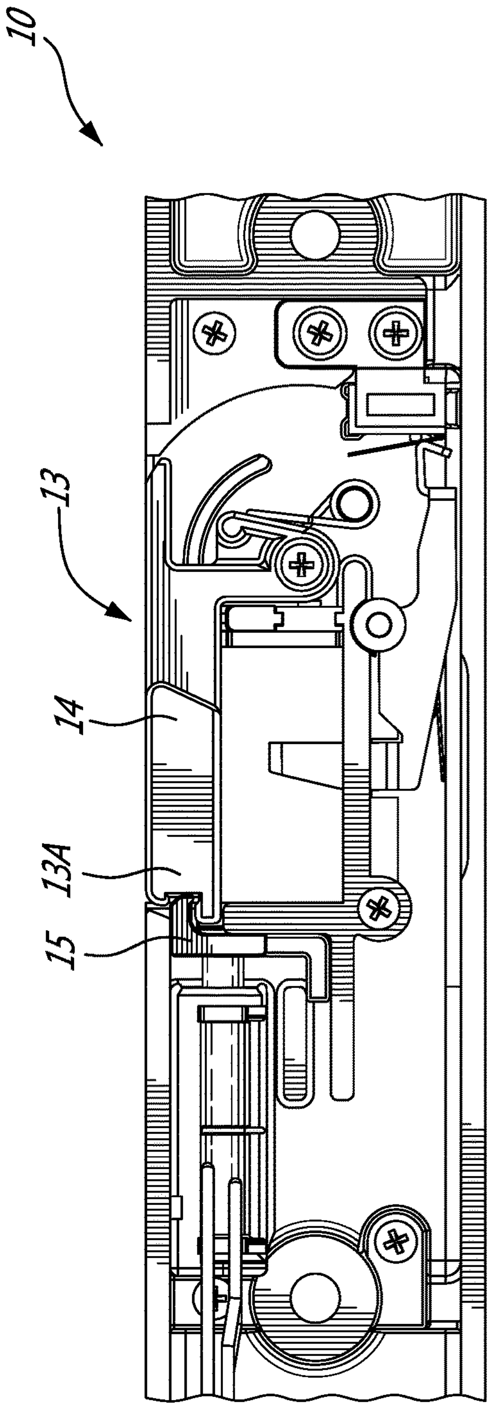
FIGS. 4A to 4C are sequential views showing the opening of the strike assembly.
Figure 4B:
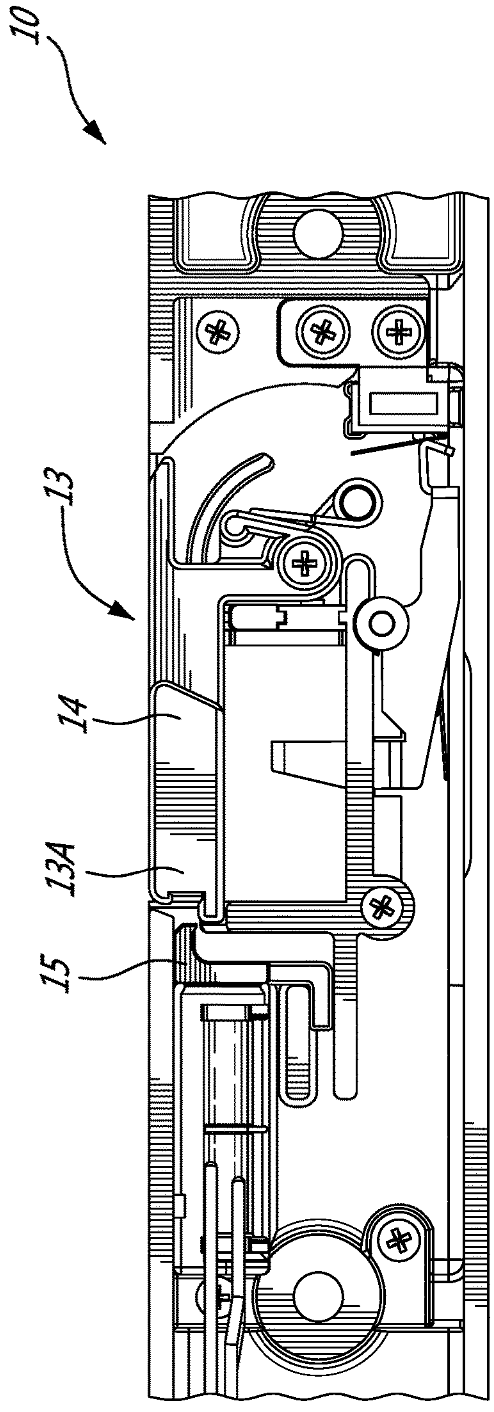
Figure 4C:
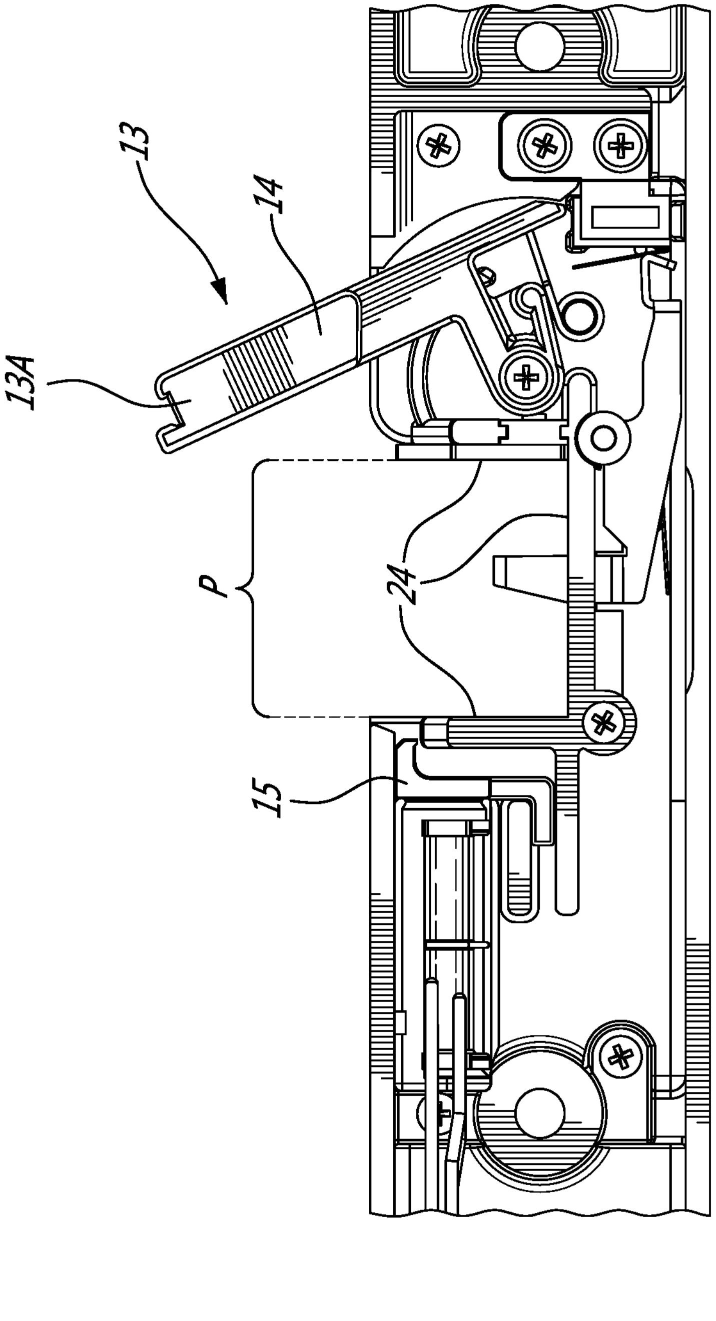

Referring successively to FIGS. 4A to 4C, it will be understood that the method of operating the electric strike 10 can include engaging a male locking member 11 into the socket 12, maintaining the keeper 13 in the closed configuration, thereby preventing the opening of the door, releasing the keeper 13, and pushing the door open, thereby moving the male locking member 11 along the horizontal escape path P.

In this specific embodiment, the male locking member 11 can be provided in the form of a Pullman type latch integrated to a panic bar 25, as shown in FIGS. 1A and 1B, for instance, but other configurations are possible in alternate embodiments. Alternately, for instance, the male locking member 11 can be a deadbolt or part of a locking mechanism of the deadlatch type. Moreover, in alternate embodiments, the keeper 13 can be controlled via an electronic access control module which allows egress when the a user input is authenticated.

Moreover, in this specific embodiment, the catch 15, which may be referred to as a locking cam, returns to the original position via the spring 23 bias as soon as the solenoid 19' is de-energized. The solenoid 19' is generally de-energized after the keeper 13 returns to the closed configuration. However, even if the keeper 13 would be to return to the closed configuration after the catch 15 returned to its original, locked position, the keeper 13 would push the catch 15 towards the solenoid 19' to free the way to return correctly to the closed position, after which the spring 23 bias would push the catch 15 back into its locking position, engaged with the keeper 13. This can be achieved by designing the mating shapes of the catch 15 and keeper 13 accordingly, and by selecting a keeper spring which is stronger than the cam spring. In this context, stronger than the cam spring means able to drive the keeper 13 closed in a manner to overcome the bias exerted by the cam spring. It will be noted that an optional latch monitor 30 is also used in this specific embodiment.

As can be understood, the examples described above and illustrated are intended to be exemplary only. The scope is indicated by the appended claims.

What is claimed is:

1. An electric strike having a housing having an internal face receivable against a receiving face of a door frame, an external strike face, a socket recessed into the strike face along a socket axis normal to the receiving face of the door frame, for receiving a male locking member retractably mounted to a door, the male locking member also being moveable transversally to the socket axis, along a horizontal escape path, by opening the door, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall of the socket blocking the horizontal escape path of the male looking member when in the closed configuration, the gate member extending from the first side of the socket to a distal end located at a second side of the socket when in the closed configuration, the gate member and the distal end being moved away from the socket and out from alignment with the escape path when pivoted into the open configuration, further comprising a catch being moveable selectively into engagement with the distal end when the distal end is in the closed configuration, to prevent pivoting the keeper into the open configuration, and out from engagement with the distal end, further comprising an electrically powered actuator controlling the movement of the catch, wherein the electrically powered actuator includes a solenoid connected to the catch via a plunger, the plunger directly connected to the catch, the solenoid being electrically operable to selectively linearly move the plunger and the catch back and forth along a solenoid axis.

2. The electric strike of claim 1 wherein the electrically powered actuator is a linear actuator configured to move the plunger and the catch along the solenoid axis, the solenoid axis being oriented vertically and normal to the pivot axis.

3. The electric strike of claim 2 wherein the linear actuator is configured to retract the catch when powered, and a spring bias is provided to bias the catch to an extended configuration, into engagement with the distal end.

4. The electric strike of claim 3 wherein the keeper is spring biased to the closed configuration, and keeper and catch are provided with mating surfaces designed to allow the returning keeper to push the catch against the catch spring bias into the closed configuration, the keeper spring bias being stronger than the catch spring bias.

5. The electric strike of claim 1 wherein the socket has a rectangular cross-section transversally to the socket axis, and includes three fixed walls made integral to the housing and each forming a corresponding one of three edges of the rectangular cross section, the fourth wall being formed by the gate member when in the closed configuration.

6. The electric strike of claim 1 wherein a thickness of the housing between the internal face and the external face is of ½".

7. The electric strike of claim 1 wherein the solenoid axis is perpendicular to the socket axis, the solenoid being housed.

8. The electric strike of claim 7 wherein the catch has a male tooth feature projecting towards the distal end, normal to the solenoid axis, and the distal end has a mating female notch feature receiving the male tooth feature when in the engaged configuration.

9. The electric strike of claim 1 wherein the actuator further comprises a biasing member biasing the catch into the engaged position and being electrically operable to move the catch from the engaged position to the disengaged position.

10. A method of operating an electric strike having a housing with an internal face received against a receiving face of a door frame, an external face, a socket recessed into the external face along a socket axis normal to the receiving face, a keeper pivotally mounted around a pivot axis parallel to the socket axis, on a first side of the socket, inside the housing, and pivotable between an open configuration and a closed configuration, the keeper having a gate member extending from the first side of the socket to a distal end located at a second side of the socket when in the closed configuration and forming a restraining wall of the socket, the method comprising:

engaging a male locking member into the socket, the male locking member being retractably mounted to a door;

maintaining a catch engaged with the distal end of the keeper, thereby maintaining the keeper in the closed configuration, preventing the male locking member from moving along a horizontal escape path transversal to the socket axis, and preventing the opening of the door; and moving the catch, via an electrically-powered actuator having a solenoid connected to the catch via a plunger directly connected to the catch, away from the distal end, thereby releasing the keeper, the solenoid being electrically operable to selectively linearly move the plunger and the catch back and forth along a solenoid axis; and pushing the door open, thereby moving the male locking member along the horizontal escape path.

11. A door system comprising a door hinged at a first edge to a first side of a door frame, a male locking member retractably mounted to the door in a manner to protrude from a second edge of the door, opposite the hinge, and an electric strike having a housing having an internal face received against a receiving face of a second side of the door frame, opposite the hinge, an external face opposite the internal face, a socket recessed into the external face along a socket axis normal to the receiving face of the door frame, for receiving the male locking member, the male locking member also being moveable transversally to the socket axis, along a horizontal escape path, by pivoting of the door around the hinge, the electric strike further having a keeper pivotally mounted around a pivot axis between a closed configuration and an open configuration, the pivot axis parallel to the socket axis and offset from the escape path on a first side of the socket, inside the housing, the keeper having a gate member forming a restraining wall of the socket blocking the horizontal escape path of the male locking member when in the closed configuration, the gate member extending from the first side of the socket to a distal end located at a second side of the socket when in the closed configuration, the gate member and the distal end being moved away from the socket and out from alignment with the escape path when pivoted into the open configuration, further comprising a catch being moveable selectively into engagement with the distal end when the distal end is in the closed configuration, to prevent pivoting the keeper into the open configuration, and out from engagement with the distal end, further comprising an electrically powered actuator controlling the movement of the catch, wherein the electrically powered actuator includes a solenoid connected to the catch via a plunger, the plunger directly connected to the catch, the solenoid being electrically operable to selectively linearly move the plunger and the catch back and forth along a solenoid axis.

12. The door system of claim 11 wherein the socket has a rectangular cross-section transversally to the socket axis, and includes three fixed walls made integral to the housing and each forming a corresponding one of three edges of the rectangular cross section, the fourth edge being formed by the gate member when in the closed configuration.

13. The door system of claim 11 wherein a thickness of the housing between the internal face and the external face is of ½".

14. The door system of claim 11 wherein the solenoid axis is perpendicular to the socket axis, the solenoid being housed within the housing.

15. The door system of claim 14 wherein the catch has a male tooth feature projecting towards the distal end, normal to the solenoid axis, and the distal end has a mating female notch feature receiving the male tooth feature when in the engaged configuration.

16. The door system of claim 11 wherein the actuator further comprises a biasing member biasing the catch into the engaged position and being electrically operable to move the catch from the engaged position to the disengaged position.

* * * * *